United States Patent [19]

Isogai et al.

[11] Patent Number: 4,916,104

[45] Date of Patent: Apr. 10, 1990

[54] CATALYST COMPOSITION FOR DECOMPOSITION OF METHANOL

[75] Inventors: Nobuo Isogai; Makoto Takagawa; Kumiko Watabe; Mikio Yoneoka; Ken Yamagishi, all of Niigata, Japan

[73] Assignee: Mitsubishi Gas Chemical Company, Inc., Tokyo, Japan

[21] Appl. No.: 295,525

[22] Filed: Jan. 10, 1989

[30] Foreign Application Priority Data

Jan. 13, 1988 [JP] Japan ................................. 63-3866
Oct. 28, 1988 [JP] Japan ................................. 63-270638

[51] Int. Cl.$^4$ ................. B01J 27/18; B01J 27/185; C01B 3/22; C01B 31/18
[52] U.S. Cl. ................. 502/213; 252/373; 423/415 A; 423/648.1; 502/208
[58] Field of Search ................. 502/213, 208

[56] References Cited

U.S. PATENT DOCUMENTS

| | | | |
|---|---|---|---|
| 2,010,427 | 8/1935 | Eversole | 502/245 |
| 2,935,544 | 5/1960 | Miller et al. | 502/208 |
| 3,327,007 | 6/1967 | Hoddings et al. | 502/213 |
| 4,431,566 | 2/1984 | Suzuki et al. | 252/373 |
| 4,620,017 | 10/1986 | Drake | 549/325 |
| 4,855,267 | 8/1989 | Cheng | 423/415 A |

FOREIGN PATENT DOCUMENTS 55101 3/1988 Japan ................................. 502/213

Primary Examiner—Paul E. Konopka
Attorney, Agent, or Firm—Wenderoth, Lind & Ponack

[57] ABSTRACT

A catalyst composition for decomposition of methanol comprising a substantially aluminum-free precipitate composed of a copper compound and a nickel compound, a phosphate salt of aluminum and an alkali metal compound, the content of the alkali metal being 1 to 100 atoms per 100 atoms in total of copper and nickel in the precipitate.

11 Claims, No Drawings

CATALYST COMPOSITION FOR DECOMPOSITION OF METHANOL

This invention relates to a catalyst composition for decomposition of methanol preferably used to produce a gas mixture of hydrogen and carbon monoxide by catalytically decomposing methanol.

Since methanol is produced on a large scale from a natural gas, coal, etc. and easy to transport, it attracts much attention as an energy source or a starting material for chemical industry in future that replaces petroleum. A gas mixture of hydrogen and carbon monoxide obtained by decomposing methanol is used as such as a fuel for internal combustion engine of automobiles, etc., a starting material in varied organic synthesis chemical industries, and so forth. Moreover, hydrogen and carbon monoxide are separated from this gas mixture, and hydrogen is used as a fuel for fuel cell, a hydrogen source for hydrogenation of varied organic compounds, etc. and carbon monoxide is used for carbonylation of varied organic compounds, etc.

It has been well known that catalysts containing transition metal elements are effective as catalysts for catalytic decomposition of methanol. For instance, a carrier-supported copper/nickel catalyst is described in Industrial and Engineering Chemistry 40, pp. 583–586, 1948, and it is stated in Nikkashi 64, pp. 423–430, 1942 that a zinc oxide catalyst is effective for decomposition of methanol. Moreover, it is stated in Nikkashi 92, pp. 659–669, 1971 that nickel has an ability to decompose methanol, and decomposition of methanol with noble metals is described in Japanese Laid-open patent application No. 68140/1982.

Known catalysts for decomposition of methanol are roughly classified into three types, a copper-type catalyst, a nickel-type catalyst and a noble metal-type catalyst.

Generally, there are problems that methyl formate tends to be secondarily formed in the copper-type catalyst and methane in the nickel-type catalyst respectively, and the noble metal-type catalyst is expensive. To solve these problems, various attempts have been made. For example, a catalyst comprising copper and nickel components and alumina or silica as a support has been proposed. Japanese Laid-open patent application No. 176545/1987 describes a copper/nickel/silica coprecipitate catalyst. Japanese Laid-open patent application No. 49945/1987 describes a catalyst obtained by adding an alkali hydroxide to a mixed solution of water-soluble salts of copper, nickel and aluminum, followed by coprecipitation, or a catalyst obtained by mixing it with a phosphate salt of aluminum.

Industrial catalysts are required to have such properties that catalytic activity at low temperatures is high, selectivities to hydrogen and carbon monoxide are high, catalytic life including strength is long and their cost is low. The known catalysts are still insufficient in that they do not meet these requirements.

For example, a copper/nickel two-component catalyst is relatively high in selectivities to hydrogen and carbon monoxide but low in activity and insufficient in strengh too, being industrially unavailable. A catalyst comprising two components, copper and nickel, and alumina as a support has sufficient strength, but is liable to allow formation of dimethyl ether by an acid point of alumina and has low selectivities to hydrogen and carbon monoxide.

Catalysts using silica, etc. instead of the acid support such as alumina have generally low catalytic performance and cannot be put to practical use. For example, Japanese Laid-open patent application No. 176545/1987 discloses a copper/nickel/silica coprecipitate catalyst which however has low activity at low temperatures, permits formation of by-product methane and does not give sufficient selectivities to hydrogen and carbon monoxide.

The present inventors have made studies on preparing a copper/nickel/aluminum coprecipitate catalyst and a catalyst comprising these three components and a phosphate salt of aluminum according to a process disclosed in Japanese Laid-open patent application No. 49945/1987, and consequently found that these catalysts show excellent activity and selectivity under normal pressure but when they are used under increased pressure, conversion of methanol and selectivities to hydrogen and carbon monoxide are notably decreased.

In the industrial processes, taking account of purification of the formed gas or separation of hydrogen and carbon monoxide from the formed gas, purification thereof and utilization of these gases in synthetic chemistry, it is advisable to conduct the decomposition reaction of methanol under increased pressure, and development of catalysts having excellent activity and selectivities even under increased pressure is demanded.

The inventors have further studied improvement of a copper/nickel catalyst to meet such requests, and as a result discovered that if a phosphate salt of aluminum and an alkali metal compound are added to a substantially aluminum-free precipitate of a copper salt and a nickel salt, a catalyst for decomposition of methanol having excellent activity, selectivities and strength is obtained, showing high performance even under pressure. This discovery has led to completion of this invention.

This invention is to provide a catalyst composition for decomposition of methanol comprising a substantially aluminum-free precipitate composed of a copper compound and a nickel compound, a phosphate salt of aluminum and an alkali metal compound, the content of the alkali metal being 1 to 100 atoms per 100 atoms in total of copper and nickel in the precipitate.

The catalyst composition of this invention can be produced by (a) mixing a basic precipitating agent with each of an aqueous solution of a water-soluble copper salt and an aqueous solution of a water-soluble nickel salt to precipitate a water-insoluble copper compound and a water-insoluble nickel compound, or (b) mixing a basic precipitating agent with an aqueous solution containing together a water-soluble copper salt and a water-soluble nickel salt to coprecipitate a water-insoluble copper compound and a water-insoluble nickel compound, and adding a phosphate salt of aluminum and a given amount of an alkali metal compound to a substantially aluminum-free precipitate composed of the water-insoluble copper compound and the water-insoluble nickel compound obtained in (a) or (b).

The water-soluble salts of copper and nickel used as starting materials to produce the catalyst composition of this invention are not particularly limited and may be any salts if showing substantial solubility in an aqueous medium. Examples of such salts include inorganic acid salts such as nitrates, sulfates and hydrochlorides, as well as organic acid salts such as acetates and formates.

Meanwhile, a basic precipitating agent used to precipitate copper and nickel in the form of water-insoluble compounds from the aqueous solutions of the water-soluble salts of copper and nickel are not particularly limited either if substantially soluble in an aqueous medium and can be selected from a wide range of basic compounds. Examples thereof include inorganic bases, e.g. alkali metal or alkaline earth metal hydroxides such as sodium hydroxide, potassium hydroxide, lithium hydroxide, magnesium hydroxide and calcium hydroxide, alkali metal or alkaline earth metal carbonates such as sodium carbonate, potassium carbonate and magnesium carbonate, alkali metal bicarbonates such as sodium bicarbonate and potassium bicarbonate, aqueous ammonia, ammonium carbonate and ammonium bicarbonate; and organic bases such as urea and ethylamine.

The aforesaid water-soluble salts of copper and nickel are dissolved either separately or together in an aqueous medium (media) to prepare aqueous solution(s). The aqueous solution(s) shall not contain insoluble matters. If the insoluble matters are present, they are previously separated and removed by means such as filtration, etc. As the aqueous medium (media), water is most convenient, but a water-miscible organic solvent may be used depending on the type of the salt used or the type of the basic precipitating agent. Examples thereof are methanol, ethanol, dioxane and tetrahydrofuran. Amounts of the copper and nickel salts dissolved in the aqueous medium (media) are not particularly limited if less than solubilities of the individual salts. When said amounts are too small, it is uneconomical.

The prepared aqueous solution(s) of the copper and nickel water-soluble salts is (are) mixed with the basic precipitating agent to precipitate copper and nickel in the form of water-insoluble compounds. On that occasion, it is advisable that the amount of the basic precipitating agent is a bit more than a stoichiometric amount necessary for precipitation, and the suitable amount is usually in the range of 1.01 to 1.3 times by equivalent. The basic precipitating agent may be added as such, but it is efficient that the basic precipitating agent is added in solution by dissolving it in an aqueous medium.

It is thus possible that from the individual aqueous solutions of the water-soluble copper salt and the water-soluble nickel salt, the water-insoluble copper compound and the water-insoluble nickel compound are separately precipitated, and the individual precipitates are combined into a precipitate mixture containing both the compounds. A mixing ratio of the precipitates depends on a Cu/Ni atomic ratio of the final catalyst. It is usually 1/0.01 to $\frac{1}{2}$, preferably 1/0.03 to 1/1.5, more preferably 1/0.05 to 1/1.5, calculated as a Cu/Ni atomic ratio.

On the other hand, from the aqueous solution containing together the water-soluble copper salt and the water-soluble nickel salt, the water-insoluble copper salt and the water-insoluble nickel salt can be precipitated as a coprecipitate. Thus, a dissolving ratio of both the starting water-soluble copper and nickel salts to the aqueous medium also depends on a Cu/Ni atomic ratio required of the final catalyst, and it is advisable that said dissolving ratio becomes in the above range, calculated as a Cu/Ni atomic ratio.

In this invention, it is generally advisable to use the latter coprecipitate.

Examples of the water-insoluble copper compound formed by the above precipitation treatment include copper hydroxide, basic copper carbonate, copper oxide and a mixture thereof. Examples of the water-insoluble nickel compound formed by the precipitation treatment include nickel hydroxide, basic nickel carbonate, nickel oxide and a mixture thereof.

The precipitation reaction proceeds even at room temperature, but it is also possible that heating is conducted at a temperature of about 40° to 80° C. to expedite and/or complete the reaction.

The resulting precipitate is washed and optionally subjected to post-treatment such as drying, etc.

To the thus obtained precipitate composed of the water-insoluble copper compound and the water-insoluble nickel compound are then added a phosphate salt of aluminum and an alkali metal compound.

Examples of the phosphate salt of aluminum being added include aluminum phosphate, aluminum monohydrogenphosphate and aluminum dihydrogenphosphate. They may contain or not contain water of crystallization, or they may be crystalline or amorphous.

It is advisable that an amount of the phosphate salt of aluminum is usually 0.01/1 to 1/1, preferably 0.05/1 to 0.5/1, more preferably 0.05/1 to 0.3/1, calculated as an atomic ratio of aluminum to the total amount of copper and nickel in the precipitate (Al/Cu+Ni).

Meanwhile, the alkali metal compound being added to the precipitate are inorganic or organic alkali metal compounds substantially free from element components that may be catalyst poisons. Examples thereof include hydroxides, oxides, carbonates, bicarbonates, nitrates, phosphates, acetates and oxalates of alkali metals. Of these, hydroxides, carbonates, bicarbonates, nitrates and phosphates of sodium, potassium and lithium are preferable; hydroxides, carbonates, nitrates and phosphates of sodium and potassium are most preferable.

These alkali metal compounds may be used either singly or in combination. An amount of the alkali metal compound can be usually 1 to 100 atoms, preferably 2 to 75 atoms, per 100 atoms in total of copper and nickel, calculated as an atomic ratio based on the total amount of copper and nickel in the precipitate.

The above phosphate salt of aluminum and the alkali metal compound can be separately added to the precipitate. Commercially available phosphate salts of aluminum include those containing considerable amounts of alkali metal compounds. When such phosphate salt of aluminum containing the alkali metal compound is used and said alkali metal compound is simultaneously introduced into the precipitate, there is no need to add the alkali metal compound separately. Unless the alkali metal compound reaches the above amount, only an insufficient amount thereof may be supplemented.

The phosphate salt of aluminum and the alkali metal compound may be added by any means that can uniformly mix the components, such as milling, kneading or stirring, etc. The order of adding them to the components is not particularly limited. The mixture comprising the thus prepared precipitate, the phosphate salt of aluminum and the alkali metal compound is dried at a temperature higher than room temperature, preferably 80° to 130° C, calcined at a temperature of, usually 200° to 800° C., preferably 300° to 500° C., and then molded in a known manner into a shape suitable for use purpose, such as a columnar, cylindrical, spherical or tablet shape.

In the molding, fillers such as diatomaceous earth, silica and graphite can be added if required unless substantially influencing the catalytic performance. The fillers may be added in precipitation, or in mixing of the precipitate with the phosphate salt of aluminum and the alkali metal compound, or in both said precipitation and mixing.

The catalyst composition of this invention prepared as above has various excellent properties that under normal pressure as well as increased pressure in the methanol decomposition reaction, it shows high catalytic activity at low temperatures, high selectivities to hydrogen and carbon monoxide, practically sufficient catalytic strength and life. Said catalyst composition is useful as a catalyst in producing hydrogen and carbon monoxide by catalytically decomposing methanol.

When using the catalyst composition of this invention in the decomposition reaction of methanol, said catalyst composition is reduced prior to the decomposition reaction of methanol. The reduction may be carried out by previously contacting it with a reductive gas such as hydrogen, or can be spontaneously conducted in the methanol decomposition reaction vessel with methanol being fed itself or hydrogen and/or carbon monoxide formed by methanol decomposition.

Thus, the methanol decomposition reaction using the catalyst composition in this invention can be performed in a manner known per se as will be concretely described below.

As the starting methanol, methanol usually employed on an industrial scale can be used as such, and may contain small amounts of impurities such as water, ethanol, etc.

The reaction pressure in using the catalyst composition in this invention is usually atmospheric pressure to 50 kg/cm$^2$, preferably atmospheric pressure to 30 kg/cm$^2$. The reaction temperature is usually 200° to 400° C., preferably 250° to 350° C. The feed rate of methanol is usually 50 to 40000 Hr$^{-1}$, preferably 200 to 10000 Hr$^{-1}$ by GHSV (ml of methanol-gas/hr/ml of catalyst).

In some usage of the reaction product gas, a purification device is added to the methanol decomposition reaction device. On that occasion, these reaction conditions can be determined in consideration of the efficiency of the overall process including operating conditions of the purification device.

The following Examples and Comparative Examples illustrate this invention more specifically. Methods of evaluating properties of catalysts prepared in said Examples and Comparative Examples are as follows.

Twenty milliliters of the catalyst was filled in a reaction tube having an inner diameter of 14 mm, and reduced with a hydrogen/nitrogen gas mixture. Subsequently, commercial methanol as a starting material was decomposed with the reduced catalyst. The reaction was performed under a pressure of normal pressure to 20 kg/cm$^2$ and a reaction temperature of 260° to 300° C. Analysis of dimethyl ether, methyl formate, methanol, H$_2$, CO, CH$_4$ and CO$_2$ in the reactor outlet gas was performed by gas chromatography. A conversion of methanol, selectivities to hydrogen and carbon monoxide and selectivities to by-products were calculated according to the following equations. The amounts in the equations are represented by mol/hr.

Conversion of methanol (%) =

$$100 \times \frac{\text{feed methanol} - \text{methanol in an outlet gas}}{\text{feed methanol}}$$

Selectivities to hydrogen and carbon monoxide (%) =

$$100 \times \frac{\text{carbon monoxide in an oulet gas}}{\text{feed methanol} - \text{methanol in an outlet gas}}$$

Selectivities to CO$_2$, dimethyl ether and methyl formate (%) =

$$100 \times \frac{\text{amount of carbon of component(s) in an outlet gas*}}{\text{feed methanol} - \text{methanol in an outlet gas}}$$

*in case of dimethyl ether and methyl formate:
2 × flow rates of the individual components (mol/h)
*in case of CO$_2$:
1 × flow rate of the component (mol/h)

EXAMPLE 1

Cupric nitrate trihydrate (0.5 mol) and 0.5 mol of nickel nitrate hexahydrate were charged in a stainless steel container and dissolved with 2 liters of pure water. Diatomaceous earth (2.2 g) was added and the mixture was maintained at 40° C. Ammonium bicarbonate (2.1 mols) was charged in another stainless steel container and dissolved with 2 liters of pure water, and the mixture was maintained at 40° C. Subsequently, under stirring, the total amount of the ammonium bicarbonate aqueous solution was poured while keeping the temperature of the content at 40° to 45° C., and the mixture was then heated to 75° C. The resulting precipitate was separated from the mother liquor, washed with pure water, and uniformly mixed with 0.1 mol of aluminum phosphate containing 5 % by weight of sodium. The mixture was dried at 115° C. and calcined at 350° C. Graphite (3 % by weight) was then added, and the product was molded with a diameter of 3 mm and a height of 3 mm to form a catalyst. A Cu:Ni:Al:Na atomic ratio of this catalyst was 0.5:0.5:0.09:0.03.

EXAMPLE 2

A catalyst was prepared in the same way as in Example 1 except that diatomaceous earth was not added and the amounts of cupric nitrate, nickel nitrate, ammonium bicarbonate and aluminum phosphate were 0.5 mol, 0.1 mol, 1.25 mols and 0.18 mol. A Cu:Ni:Al:Na atomic ratio of this catalyst was 0.5:0.1: 0.17:0.05.

EXAMPLE 3

A catalyst was prepared in the same way as in Example 1 except that 2.1 mols of sodium hydroxide was used instead of 2.1 mols of ammonium bicarbonate, both the temperature of the mixed solution of cupric nitrate and nickel sulfate and the temperature of the sodium hydroxide aqueous solution were changed to 70° C., and after mixing both the solutions, the temperature was maintained at 70° to 75° C. It was found that a Cu:Ni:Al:Na atomic ratio of this catalyst was the same as in Example 1 and sodium hydroxide used to obtain the precipitate little remained by washing it with pure water.

COMPARATIVE EXAMPLE 1

The procedure in Example 1 was repeated except that aluminum phosphate was not added to the coprecipitate of copper and nickel.

COMPARATIVE EXAMPLE 2

Cupric nitrate trihydrate (0.5 mol), 0.05 mol of nickel nitrate hexahydrate and 0.1 mol of aluminum nitrate nonahydrate were charged in a stainless steel container and dissolved with 1.8 liters of pure water, and the solution was maintained at 75° C. Sodium hydroxide (1.45 mols) was charged in another stainless steel container and dissolved with 1.45 liters of pure water, and the solution was maintained at 70° C. To the stainless steel container charged with the nitrate aqueous solution was poured the total amount of the sodium hydroxide aqueous solution under stirring. Thereafter, with stirring, the temperature of the content was kept at 80° C. The resulting precipitate was separated from the mother liquor and thoroughly washed with pure water. The total amount of the precipitate separated by filtration was uniformly mixed with 0.05 mol of aluminum phosphate containing 5% by weight of sodium. The mixture was dried at 115° C., and then calcined at 350° C. Graphite (3% by weight) was added, and the product was molded with a diameter of 3 mm and a height of 3 mm. A Cu:Ni:Al:Na atomic ratio of this catalyst was 0.5:0.05:0.15:0.014, and 0.10 of 0.15 of Al was contained in the Cu-Ni precipitate.

COMPARATIVE EXAMPLE 3

The procedure in Comparative Example 2 was repeated except that aluminum phosphate was not added to the copper/nickel/aluminum coprecipitate.

Subsequently, a test for activity of the catalysts obtained in Examples 1-3 and Comparative Examples 1-3 was carried out. A feed rate of methanol was 2000 $Hr^{-1}$ by GHSV. The results are shown in Table 1. In Table 1, MeOH indicates methanol, DME diethyl ether, MF methyl formate, respectively.

During the test for activity, no abnormality was found in the catalysts in Examples 1-3 and Comparative Examples 2 and 3. However, in the test for activity using the catalyst obtained in Comparative Example 1, a pressure difference of the catalyst layer began to increase gradually from reduction of the catalyst. When 30 hours passed from the start-up of the reaction, the reaction could not continue. When the reactor was released and the catalyst was withdrawn, notable pulverization was observed and strength of the catalyst was found insufficient.

From this, it follows that the catalyst composed of the copper/nickel precipitate and the phosphate salt of aluminum containing the alkali metal has high selectivities to hydrogen and carbon monoxide and sufficient strength.

EXAMPLE 4

Cupric nitrate trihydrate (0.5 mol) and 0.05 mol of nickel nitrate hexahydrate were charged in a stainless steel container and dissolved with 1.2 liters of pure water. Diatomaceous earth (1.2 g) was added and the mixture was maintained at 40° C. Ammonium bicarbonate (1.2 mols) was charged in another stainless steel container and dissolved with 1.2 liters of pure water, and the solution was maintained at 40° C. Subsequently, under stirring, the total amount of the ammonium bicarbonate aqueous solution was poured while keeping the temperature of the content at 40° to 45° C., and the mixture was then heated to 75° C. The resulting precipitate was separated from the mother liquor and washed with pure water. Thereafter, 0.1 mol of aluminum phosphate (sodium content 0.08% by weight) and 0.1 mol of sodium nitrate were uniformly mixed, dried at 115° C. and calcined at 350° C. Subsequently, 3% by weight of graphite was added, and the product was molded with a diameter of 3 mm and a height of 3 mm to form a catalyst. A Cu:Ni:Al:Na atomic ratio of this catalyst was 0.5:0.05:0.1:0.1.

EXAMPLE 5

A precipitate was formed in exactly the same way as in Example 1 . Said precipitate was uniformly mixed with 0.5 mol of aluminum phosphate (sodium content 0.08% by weight) and 0.1 mol of potassium nitrate. The mixture was dried at 115° C. and calcined at 350° C. A catalyst was then prepared as in Example 4. A Cu:Ni:Al:K atomic ratio of the catalyst was 0.5:0.05:0.5:0.1.

EXAMPLE 6

A catalyst was prepared as in Example 4 except that 0.6 mol of sodium carbonate was used instead of 1.2 mols of ammonium bicarbonate, 0.5 mol of aluminum phosphate (sodium content 0.08% by weight), and 0.2 mol of sodium carbonate was used instead of 0.1 mol of sodium nitrate. A Cu:Ni:Al:Na atomic ratio of the catalyst was 0.5:0.05:0.5:0.4.

EXAMPLE 7

A catalyst was prepared as in Example 5 except that 1.2 mols of sodium hydroxide was used instead of 2.1 mols of ammonium bicarbonate, 0.4 mol of sodium hy-

TABLE 1

| | Reaction pressure (kg/cm$^2$) | Reaction temperature (° C.) | Conversion of MeOH | Selectivity (%) | | | | |
|---|---|---|---|---|---|---|---|---|
| | | | | CO | CH$_4$ | CO$_2$ | DME | MF |
| Example 1 | 0 | 280 | 96.3 | 100.00 | 0.00 | 0.00 | 0.00 | 0.00 |
| | 5 | 280 | 67.8 | 99.97 | 0.01 | 0.00 | 0.00 | 0.02 |
| | 5 | 300 | 94.4 | 99.98 | 0.02 | 0.00 | 0.00 | 0.00 |
| Example 2 | 0 | 280 | 95.6 | 100.00 | 0.00 | 0.00 | 0.00 | 0.00 |
| | 5 | 280 | 70.5 | 99.97 | 0.01 | 0.00 | 0.01 | 0.01 |
| | 5 | 300 | 95.7 | 99.97 | 0.01 | 0.00 | 0.02 | 0.00 |
| Example 3 | 0 | 280 | 97.9 | 99.98 | 0.01 | 0.00 | 0.01 | 0.00 |
| | 5 | 280 | 74.2 | 99.95 | 0.03 | 0.01 | 0.01 | 0.00 |
| | 5 | 300 | 94.9 | 99.94 | 0.04 | 0.01 | 0.01 | 0.00 |
| Comparative Example 1 | 0 | 280 | 85.3 | 100.00 | 0.00 | 0.00 | 0.00 | 0.00 |
| | 5 | 280 | 49.5 | 99.95 | 0.01 | 0.00 | 0.00 | 0.04 |
| | 5 | 300 | 83.6 | 99.98 | 0.02 | 0.00 | 0.00 | 0.00 |
| Comparative Example 2 | 0 | 280 | 95.8 | 97.9 | 0.15 | 0.59 | 1.36 | 0.00 |
| | 5 | 280 | 71.0 | 93.91 | 0.49 | 1.66 | 3.90 | 0.04 |
| | 5 | 300 | 96.2 | 93.58 | 0.66 | 1.69 | 4.07 | 0.00 |
| Comparative Example 3 | 0 | 280 | 98.5 | 97.74 | 0.15 | 0.62 | 1.49 | 0.00 |
| | 5 | 280 | 73.5 | 94.02 | 0.52 | 1.68 | 3.76 | 0.02 |
| | 5 | 300 | 98.0 | 93.63 | 0.68 | 1.61 | 4.08 | 0.00 | droxide was used instead of 0.1 mol of potassium nitrate, diatomaceous earth was not added, both the temperature of the aqueous solution of cupric nitrate and nickel nitrate and the temperature of sodium hydroxide were changed to 70° C, and after mixing both the solutions, the temperature was maintained at 70° to 75° C. A Cu:Ni:Al:Na atomic ratio of this catalyst was 0.5:0.05:0.5:0.4.

EXAMPLE 8

A catalyst was prepared as in Example 4 except that 0.1 mol of lithium hydroxide was used instead of 0.1 mol of sodium nitrate. A Cu:Ni:Al:Li atomic ratio of this catalyst was 0.5:0.05:0.1:0.1.

COMPARATIVE EXAMPLE 4

A catalyst was prepared as in Example 4 except that sodium nitrate was not added.

Subsequently, the feed rate of methanol was made 1000 $Hr^{-1}$ by GHSV, and a test for activity of the catalysts obtained in Examples 4–8 and Comparative Examples 4–5 was carried out with the results shown in Table 2. By the way, in Comparative Example 5, the test for activity of the catalyst was run under the same conditions as in Examples 4–8 using the same catalyst as obtained in Comparative Example 2. From the test results, it becomes apparent that the catalyst obtained with the addition of the alkali metal allows less formation of dimethyl ether, etc. as by-products even under higher pressure than the catalyst obtained with the addition of the phosphate salt of ammonium alone, and gives excellent selectivities to carbon monoxide and hydrogen.

TABLE 2

|  | Reaction pressure ($kg/cm^2$) | Reaction temperature (° C.) | Conversion of MeOH | Selectivity (%) | | | | |
|---|---|---|---|---|---|---|---|---|
|  |  |  |  | CO | $CH_4$ | $CO_2$ | DME | MF |
| Example 4 | 0 | 260 | 74.2 | 100.00 | 0.00 | 0.00 | 0.00 | 0.00 |
|  | 10 | 280 | 68.8 | 99.90 | 0.04 | 0.05 | 0.01 | 0.00 |
|  | 20 | 300 | 72.1 | 99.83 | 0.08 | 0.06 | 0.01 | 0.00 |
| Example 5 | 0 | 260 | 74.5 | 100.00 | 0.00 | 0.00 | 0.00 | 0.00 |
|  | 10 | 280 | 70.5 | 99.92 | 0.06 | 0.01 | 0.01 | 0.00 |
|  | 20 | 300 | 73.7 | 99.89 | 0.07 | 0.03 | 0.01 | 0.00 |
| Example 6 | 0 | 260 | 76.9 | 100.00 | 0.00 | 0.00 | 0.00 | 0.00 |
|  | 10 | 280 | 74.2 | 99.89 | 0.04 | 0.05 | 0.02 | 0.00 |
|  | 20 | 300 | 77.9 | 99.88 | 0.07 | 0.04 | 0.01 | 0.00 |
| Example 7 | 0 | 260 | 76.9 | 100.00 | 0.00 | 0.00 | 0.00 | 0.00 |
|  | 10 | 280 | 74.2 | 99.90 | 0.06 | 0.04 | 0.00 | 0.00 |
|  | 20 | 300 | 77.9 | 99.87 | 0.06 | 0.06 | 0.01 | 0.00 |
| Example 8 | 0 | 260 | 73.8 | 100.00 | 0.00 | 0.00 | 0.00 | 0.00 |
|  | 10 | 280 | 70.0 | 98.71 | 0.18 | 0.10 | 0.01 | 0.00 |
|  | 20 | 300 | 70.6 | 99.52 | 0.32 | 0.14 | 0.02 | 0.00 |
| Comparative Example 4 | 0 | 260 | 72.8 | 100.00 | 0.00 | 0.00 | 0.00 | 0.00 |
|  | 10 | 280 | 69.3 | 98.31 | 0.91 | 0.66 | 0.10 | 0.02 |
|  | 20 | 300 | 58.9 | 96.18 | 1.86 | 1.84 | 0.12 | 0.00 |
| Comparative Example 5 | 0 | 260 | 73.2 | 97.64 | 0.05 | 0.69 | 1.62 | 0.00 |
|  | 10 | 280 | 61.3 | 90.03 | 1.10 | 2.84 | 5.87 | 0.06 |
|  | 20 | 300 | 57.3 | 81.33 | 1.86 | 6.51 | 10.08 | 0.22 |

What we claim is:

1. A catalyst composition for decomposition of methanol comprising a substantially aluminum-free precipitate composed of a copper compound and a nickel compound, a phosphate salt of aluminum and an alkali metal compound, the content of the alkali metal being 1 to 100 atoms per 100 atoms in total of copper and nickel in the precipitate.

2. The catalyst composition of claim 1 wherein the precipitate is a coprecipitate resulting from coprecipitation from an aqueous solution containing together a water-soluble copper salt and a water-soluble nickel salt using a basic precipitating agent.

3. The catalyst composition of claim 1 wherein the ratio of the copper compound to the nickel compound in the precipitate is in the range of 1/0.01 to 1/2, calculated as a Cu/Ni atomic ratio.

4. The catalyst composition of claim 3 wherein the ratio of the copper compound to the nickel compound in the precipitate is in the range of 1/0.03 to 1/1.5, calculated as a Cu/Ni atomic ratio.

5. The catalyst composition of claim 1 wherein the copper compound is copper hydroxide, basic copper carbonate, copper oxide or a mixture thereof, and the nickel compound is nickel hydroxide, basic nickel carbonate, nickel oxide or a mixture thereof.

6. The catalyst composition of claim 1 wherein the phosphate salt of aluminum is aluminum phosphate, aluminum monohydrogenphosphate or aluminum dihydrogenphosphate.

7. The catalyst composition of claim 1 wherein the phosphate salt of aluminum is contained in the range of 0.01/1 to 1/1, calculated as an atomic ratio of aluminum to the total amount of copper and nickel in the precipitate (Al/Cu+Ni).

8. The catalyst composition of claim 7 wherein the phosphate salt of aluminum is contained in the range of 0.05/1 to 0.5/1, calculated as an atomic ratio of aluminum to the total amount of copper and nickel in the precipitate (Al/Cu+Ni).

9. The catalyst composition of claim 1 wherein the alkali metal compound is a hydroxide, a bicarbonate, a carbonate, a nitrate or a phosphate of sodium, potassium or lithium.

10. The catalyst composition of claim 1 wherein the content of the alkali metal is 2 to 75 atoms per 100 atoms in total of copper and nickel in the precipitate.

11. A process for producing a catalyst composition for decomposition of methanol, which comprises either combining precipitates obtained by separately precipitating a water-insoluble copper compound and a water-insoluble nickel compound with a basic precipitating agent from an aqueous solution of a water-soluble copper salt and an aqueous solution of a water-soluble nickel salt, or coprecipitating a water-insoluble copper compound and a water-insoluble nickel compound with a basic precipitating agent from an aqueous solution containing together a water-soluble copper salt and a water-soluble nickel salt, and adding a phosphate salt of aluminum and

* * * * *